United States Patent [19]

Hoeptner

[11] Patent Number: 4,964,709
[45] Date of Patent: Oct. 23, 1990

[54] FOLDABLE BINOCULARS WITH ENCLOSED SIDE WALLS

[75] Inventor: Herbert W. Hoeptner, Morgan Hill, Calif.

[73] Assignee: Custom Chrome, Inc., Morgan Hill, Calif.

[21] Appl. No.: 331,861

[22] Filed: Mar. 27, 1989

[51] Int. Cl.[5] .............................................. G02B 23/20
[52] U.S. Cl. .................................... 350/546; 350/145
[58] Field of Search ................................. 350/546, 145

[56] References Cited

U.S. PATENT DOCUMENTS

| | | |
|---|---|---|
| 2,715,853 | 8/1955 | Austin . |
| 2,768,554 | 10/1956 | Leslie . |
| 2,789,460 | 4/1957 | Kaufman . |
| 2,986,830 | 6/1961 | Underberg et al. . |
| 3,553,866 | 1/1971 | Redford et al. . |
| 3,562,939 | 2/1971 | Jacobs, Jr. et al. . |
| 4,013,341 | 3/1977 | Riley . |
| 4,175,828 | 11/1979 | Carver . |
| 4,239,328 | 12/1980 | Justice, Sr. et al. . |
| 4,268,111 | 5/1981 | Green et al. . |
| 4,443,071 | 4/1984 | Ueda . |
| 4,478,498 | 10/1984 | Ohno . |
| 4,486,079 | 12/1984 | Ueda . |
| 4,773,747 | 9/1988 | Bresnahan . |

FOREIGN PATENT DOCUMENTS 8501121  3/1985  World Int. Prop. O. ......... 350/145

Primary Examiner—Bruce Y. Arnold
Assistant Examiner—Rebecca D. Gass
Attorney, Agent, or Firm—William W. Haefliger

[57] ABSTRACT

A binoculars has lenses carried by sheet structure defining a box that is foldable between collapsed position and focus adjusting extended positions; the box in adjustable extended position having front and rear walls carrying the lenses; the box in extended position having top and bottom walls each defining fold lines, and also having left and right side walls defining fold lines; the fold lines enabling folding of the box from extended to collapsed position, during which the top and bottom walls move relatively apart and the left and right walls move relatively toward one another; the left and right side walls having fold connection to the top and bottom walls to block light entrance into the box interior in each of the referenced extended positions.

16 Claims, 3 Drawing Sheets

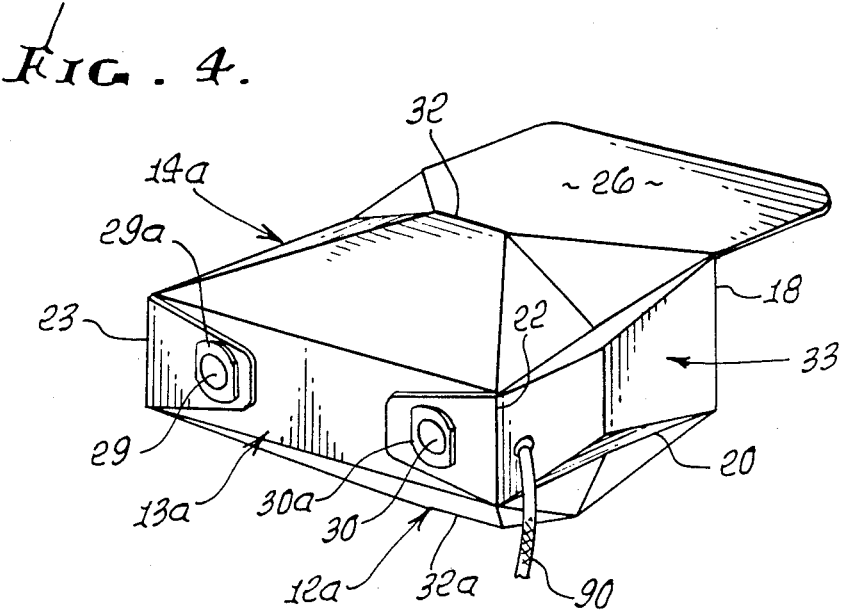
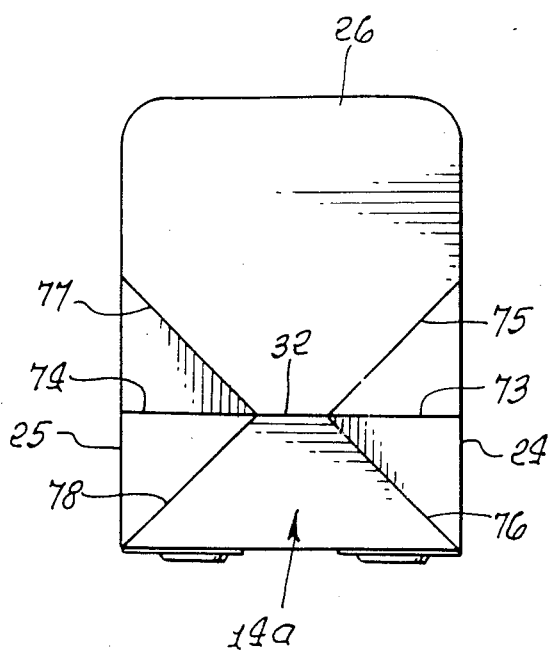
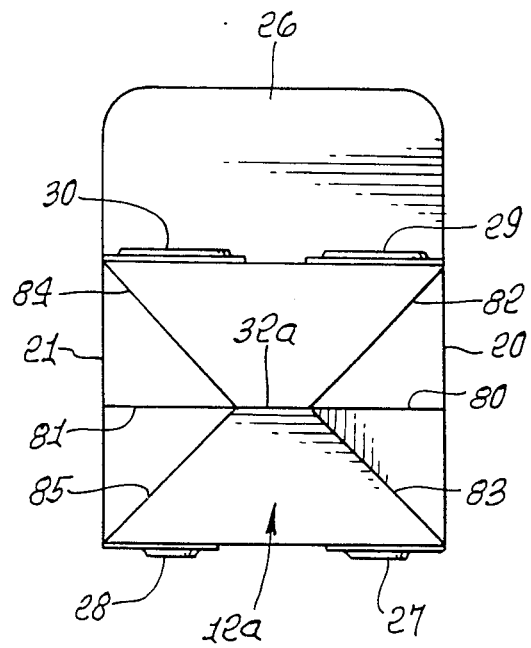

FOLDABLE BINOCULARS WITH ENCLOSED SIDE WALLS

BACKGROUND OF THE INVENTION

This invention relates generally to binoculars, and more particularly, that form of binocular which is defined by a foldable sheet of material, as for example cardboard.

Simple, inexpensive binoculars which may be folded between flat collapsed position, and a range of extended, adjustable positions (for focus), and made for example of cardboard, are known. However, such binoculars have lacked a foldable construction characterized in that the extended binoculars did not admit light to the interior of the binoculars, and thus interfere with viewing. For example, light generally entered, via the open opposite sides of the unit, to the interior thereof, interfering with sharpness of viewing via lens carried by front and rear walls. It was not believed possible to additionally provide foldable side walls that blocked light. There is, therefore, need for an improved foldable binocular construction overcoming this defect.

SUMMARY OF THE INVENTION

It is a major object of the invention to provide an improved foldable binoculars meeting the above need. Basically, the improved binoculars has lenses carried by sheet structure defining a box that is foldable between collapsed and adjustable extended positions, and basically comprises:

(a) the box in adjustable, extended positions having front and rear walls carrying the lenses, (b) the box in extended positions having top and bottom walls each defining fold lines, and also having left and right side walls defining fold lines, (c) the fold lines enabling folding of the box from extended to collapsed positions, during which the top and bottom walls move relatively apart and the left and right walls move relatively toward one another, (d) the left and right side walls also having fold connection to the top and bottom walls, to block light entrance into the box interior.

As will be seen, the top and bottom walls project away from one another, and left and right side walls project toward one another, in a range of adjustable, extended positions, the folding tending to urge the box toward extended position. In this regard, the top and bottom walls typically have foldable bellows configuration; and also the front wall has connection to the top and bottom walls along certain fold lines, and the rear wall has connection to the top and bottom wall along other fold lines, the certain and other fold lines extending in parallel relation.

It is a further object to provide each of the left and right side walls in the form of two sections interconnected by, and tapering toward, an upright fold line. These two sections typically taper toward the interior of the box, but out of the lines of vision in the box in such extended positions.

A further object is to provide tabs on the side walls which are attached to the front and side walls, the tabs defining openings in alignment with the lenses.

The box-like construction with such walls enclosing the box interior may advantageously be achieved by employing a sheet blank that comprises:

(a) longitudinally sequential, first, second, third, and fourth sections defining parallel fold lines between the first and second sections, between the second and third sections, and between the third and fourth sections; the first and third sections adapted to form front and rear walls of the box, and the second and fourth sections adapted to form bottom and top walls of the box, the sections defining a substantially rectangular unit, in as-cut blank configuration, (b) lenses attached to the first and third sections, (c) and the sheet having wings with fold connection to opposite lateral sides of the fourth section, and means associated with the wings to connect them to opposite lateral sides of the second section.

As will appear, tabs are typically advantageously provided on the wings for connection to the second section when the blank is folded into box shape, thereby to enclose the box interior.

These and other objects and advantages of the invention, as well as the details of an illustrative embodiment, will be more fully understood from the following specification and drawings in which:

DRAWING DESCRIPTION

FIG. 4 is a perspective view of the extended binoculars viewed from the right-rear;

FIG. 5 is a top plan view of the FIG. 4 binoculars; and

FIG. 6 is a bottom plan view of the FIG. 4 binoculars.

DETAILED DESCRIPTION

Figure 1:
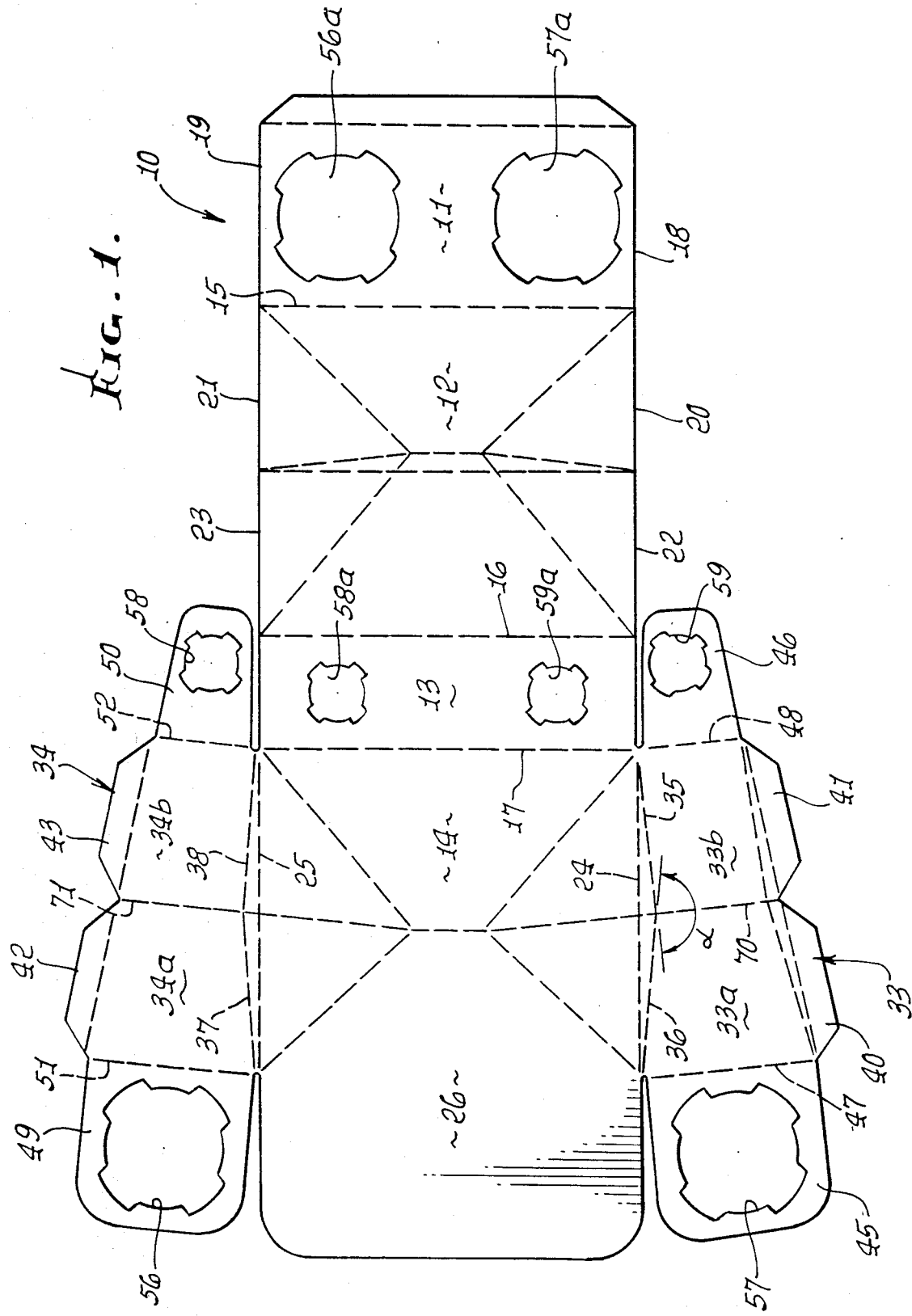
FIG. 1 is a plan view of a sheet blank construction to be folded into the box-like binoculars of the invention.

Referring first to FIG. 1, the cardboard (or like material) sheet blank 10 has longitudinally sequentially, first, second, third, and fourth sections 11-14. These define parallel fold lines 15-17, wherein:

fold line 15 interconnects sections 11 and 12
fold line 16 interconnects sections 12 and 13, and
fold line 17 interconnects sections 13 and 14

Figure 3:
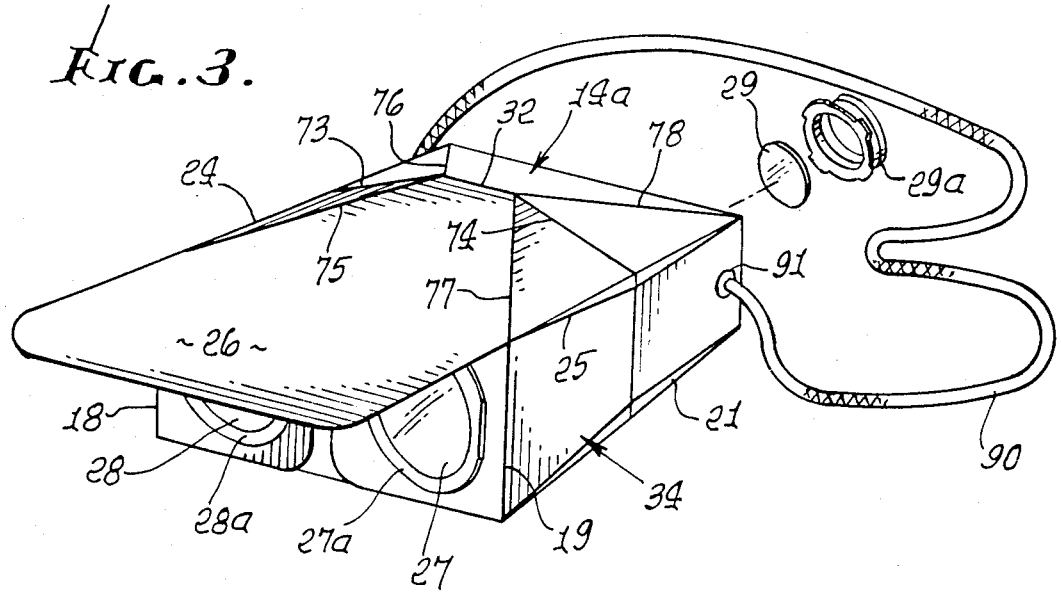
FIG. 3 is a perspective view of the extended (unfolded) binoculars, viewed from the left-front.

The sections are related to four walls of the binoculars' box in FIGS. 3 and 4 as follows:

section 11 forms front wall 11a of box
section 12 forms bottom wall 12a of box
section 13 forms rear wall 13a of box
section 14 forms top wall of 14a of box Sections 11-14 define a rectangular or substantially rectangular unit, with lateral edges 18-25, also seen in FIGS. 3 and 4. A visor section 26 is connected to section 14 (top wall 14a), to overhang the front wall, and the objective lenses 27-28 are carried by that wall. Smaller eyepiece lenses 29 and 30 are carried by the rear wall, as shown, and lenses 27 and 29 remain in alignment as the box is yieldably adjusted, by finger pressure at ridge apices 32 and 33 to move the top and bottom walls toward or away from one another (in extended, adjustable positions of the box) to vary the focus. Lens 28 and 30 also remain in alignment during the adjustment. The tendency to unfold urges the box, yieldably, toward extended (open) position.

The sheet blank 10 also has wings 33 and 34 having fold connection with opposite lateral edges of the section 14, two actual developed fold lines 35 and 36 angled slightly from straight line 24, and two actual developed fold lines 37 and 38 similarly angled slightly from straight line 25. Lines 35 and 36 intersect at an angle α of about 170°, as do lines 37 and 38. This assures inward folding of the box side walls 33a and 34a corresponding to wings 33 and 34, as the top and bottom walls are deflected toward one another.

Tabs 40 and 41 on wing 33 connect (bond) to the top wall, at edge 20 thereof, and tabs 42 and 43 on wing 34 connect to the top wall at edge 21 thereof, whereby the box interior is enclosed, and light cannot enter the box interior via the lateral sides of the box, as the box is adjusted. Longitudinally spaced tabs 45 and 46 on wing 33 fold at lines 47 and 48 to connect to the front and rear walls 11a and 13a, as via a bonding agent; and tabs 49 and 50 on wing 34 fold at lines 51 and 52 to bond to the front and rear walls 11a and 13a. Those tabs contain through openings at 56–59 to register with corresponding lens openings 56a–59a, for edge supporting the lens rings 27a–30a.

Note that the side walls form sections that taper inwardly, i.e., toward the box interior, i.e., to allow side wall inward flexing as the box is adjusted. Thus, side wall 33 forms sections 33a and 33b, intersecting at fold line 70; and side wall 34 forms sections 34a and 34b intersecting at fold line 71.

The top and bottom walls have bellows fold configuration; thus, see fold lines 73 and 74 on the top wall that fold inwardly as the box is collapsed, the fold lines 75–78 remaining outwardly; likewise, the fold lines 80 and 81 on the bottom wall fold inwardly as the box is collapsed, the fold lines 82–85 remaining outwardly as the box is collapsed. Short ridge fold lines 32 and 33 are formed on top and bottom walls, to aid the collapsing.

Figure 2:
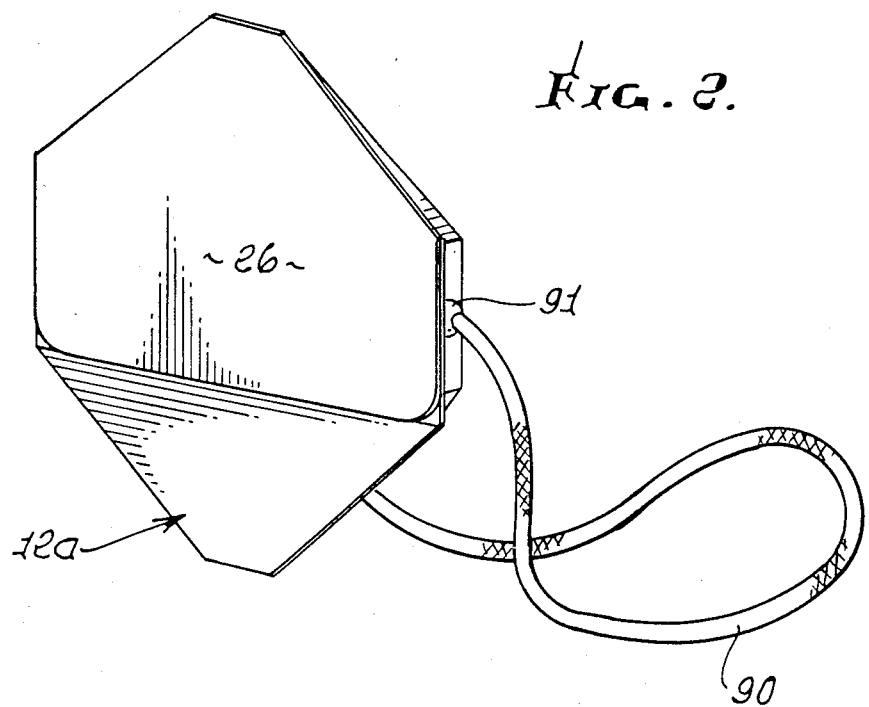
FIG. 2 is a perspective view of the binoculars in folded condition.

A looping, flexible handle 90 has opposite ends 91 that connect to the opposite side walls, as seen in FIGS. 2 and 3.

The completely collapsed binoculars appears in FIG. 2.

I claim:

1. In a binoculars having lenses carried by sheet structure defining a box that is foldable between collapsed and focus adjustable extended positions, the combination comprising:
   (a) said box in said focus adjustable extended positions having front and rear walls carrying said lenses,
   (b) said box in extended positions having top and bottom walls each defining fold line, and also having left and right side walls defining old lines,
   (c) said fold lines enabling folding of the box from said focus adjustable extended positions to said collapsed positions, during which said top and bottom walls move relatively apart and said left and right walls move relatively toward one another,
   (d) said left and right side walls having fold connection to said top and bottom walls to block light entrance into said box interior.

2. The combination of claim 1 wherein the top and bottom walls project away from one another, and said left and right side walls project toward one another, in said focus adjustable extended positions.

3. The combination of claim 1 wherein said lenses are carried by said front and rear walls, and include left and right lenses characterized in that said left lenses carried by said front and rear walls remain in alignment in said focus adjustable extended positions, and said right lenses carried by the front and rear walls remain in alignment in said extended positions.

4. The combination of claim 1 wherein said fold lines defined by said top and bottom walls have bellows fold configuration.

5. The combination of claim 1 wherein the front wall has certain fold line connection to said top and bottom walls, and said rear wall has other fold line connection to said top and bottom walls, said certain and other fold line connections extending in parallel relation.

6. The combination of claim 1 wherein each of said left and right side walls has two sections interconnected by and tapering toward an upright fold line.

7. The combination of claim 6 wherein said two sections of each side wall taper toward the interior of the box 8. The combination of claim 1 including tabs on said side walls which are attached to said front and rear walls, the tabs defining openings in alignment with said lenses.

9. The combination of claim 1 wherein each of said left and right side walls has fold line connection to the top wall.

10. The binoculars of claim 1 including a looping, flexible handle having opposite sides connected with said left and right side walls.

11. A sheet blank adapted to be folded into a box to form a binocular, comprising
   (a) the sheet having longitudinally, sequentially, first, second, third, and fourth sections defining parallel fold lines between said first and second sections, between said second and third sections, and between said third and fourth sections, said first and third sections adapted to form front and rear walls of the box, and said second and fourth sections adapted to form bottom and top walls of said box, said sections defining a substantially rectangular unit,
   (b) lenses attached to said first and third sections,
   (c) and said sheet having wings with fold connection with the opposite lateral sides of said fourth section and means associated with said wings to connect them to opposite lateral sides of said second section.

12. The blank of claim 10 including a visor section connected to said fourth section.

13. The blank of claim 10 including tabs on said wings for connection to said second section when the blank is folded into said box, thereby to enclose the box interior.

14. The blank of claim 10 including longitudinally spaced tabs on said wings for connection to said first and said third sections when the blank is folded into said box.

15. The blank of claim 14 wherein said tabs define openings for alignment with said lenses.

16. The blank of claim 10 wherein said first and said third sections define multiple fold lines having a bellows fold configuration when the blank is folded into a box, and the box is collapsed.

* * * * *